United States Patent
Castelli et al.

(10) Patent No.: US 8,358,302 B2
(45) Date of Patent: Jan. 22, 2013

(54) DYNAMIC CREATION OF VIRTUAL REGIONS

(75) Inventors: Vittorio Castelli, Croton on Hudson, NY (US); Rick A. Hamilton, II, Charlottesville, VA (US); Brian M. O'Connell, Cary, NC (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 980 days.

(21) Appl. No.: 12/107,360

(22) Filed: Apr. 22, 2008

(65) Prior Publication Data

US 2009/0262107 A1 Oct. 22, 2009

(51) Int. Cl.
*G06T 15/00* (2011.01)

(52) U.S. Cl. ........ 345/419; 345/473; 345/474; 345/475; 707/640; 707/655; 707/805; 709/216; 709/217; 715/757

(58) Field of Classification Search .................. 345/419, 345/473, 474, 475; 707/640, 655, 805; 709/216, 709/217; 715/757
See application file for complete search history.

(56) References Cited

U.S. PATENT DOCUMENTS

| 6,088,698 | A | 7/2000 | Lipkin |
| 6,262,734 | B1 | 7/2001 | Ishikawa |
| 6,466,239 | B2 | 10/2002 | Ishikawa |
| 6,958,752 | B2 | 10/2005 | Jennings et al. |
| 7,038,694 | B1 | 5/2006 | Santodomingo et al. |
| 7,139,796 | B2 | 11/2006 | Rekimoto et al. |
| 7,792,801 | B2 * | 9/2010 | Hamilton et al. ............. 707/655 |
| 7,847,808 | B2 * | 12/2010 | Cheng et al. .................. 345/634 |
| 7,882,222 | B2 * | 2/2011 | Dolbier et al. ................ 709/224 |
| 7,921,128 | B2 * | 4/2011 | Hamilton et al. ............. 707/758 |
| 8,171,408 | B2 * | 5/2012 | Dawson et al. ............... 715/706 |
| 2006/0030405 | A1 | 2/2006 | Robertson |
| 2006/0031578 | A1 | 2/2006 | Pelletier |

FOREIGN PATENT DOCUMENTS

| EP | 1004989 | 5/2000 |
| EP | 1813330 | 8/2007 |

* cited by examiner

*Primary Examiner* — Phu K Nguyen (74) *Attorney, Agent, or Firm* — DeLizio Gilliam, PLLC (57) ABSTRACT

In various embodiments, virtual universe regions are dynamically generated within a virtual universe based on user requests. Dynamic generation allows virtual universe users or "residents" to create virtual universe regions that are tailored to their desired specifications. Additionally, in some implementations, virtual universe users may have the option to instantly discard or retain a created region after evaluation based on whether the region meets the user's expectations. Furthermore, dynamic generation of regions may increase user satisfaction and provide additional means for revenue generation for the virtual universe administrator and for virtual universe businesses and entrepreneurs.

20 Claims, 4 Drawing Sheets

DYNAMIC CREATION OF VIRTUAL REGIONS

BACKGROUND

Embodiments of the inventive subject matter generally relate to the field of virtual universe systems, and, more particularly, to dynamic creation of virtual universe regions.

Virtual universe applications allow people to socialize and interact in a virtual universe. A virtual universe ("VU") is a computer-based simulated environment intended for its residents to traverse, inhabit, and interact through the use of avatars. Many VUs are represented using 3-D graphics and landscapes, and are populated by many thousands of users, known as "residents." Other terms for VUs include metaverses and "3D Internet."

SUMMARY

Various embodiments are disclosed of a method and apparatus for dynamically generating a virtual universe region within a virtual universe. According to one embodiment, a plurality of virtual universe objects are identified based, at least in part, on virtual universe region attribute data that indicate one or more region attributes in a virtual universe. The virtual universe region attribute data are associated with an avatar. The virtual universe region is dynamically generated with the plurality of virtual universe objects.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, examples refer to a user indicating whether to retain or discard a dynamically created region, but embodiments may also generate a thumbnail icon representative of the region to be created and/or even a textual description of virtual universe object to be used in the creation prior to creation of the region. In other instances, well-known instruction instances, protocols, structures and techniques have not been shown in detail in order not to obfuscate the description.

In various embodiments, virtual universe regions are dynamically generated within a virtual universe based on user requests. Dynamic generation allows virtual universe users or "residents" to create virtual universe regions that are tailored to their desired specifications. Additionally, in some implementations, virtual universe users may have the option to instantly discard or retain a created region after evaluation based on whether the region meets the user's expectations. Furthermore, dynamic generation of regions may increase user satisfaction and provide additional means for revenue generation for the virtual universe administrator and for virtual universe businesses and entrepreneurs.

Figure 1:
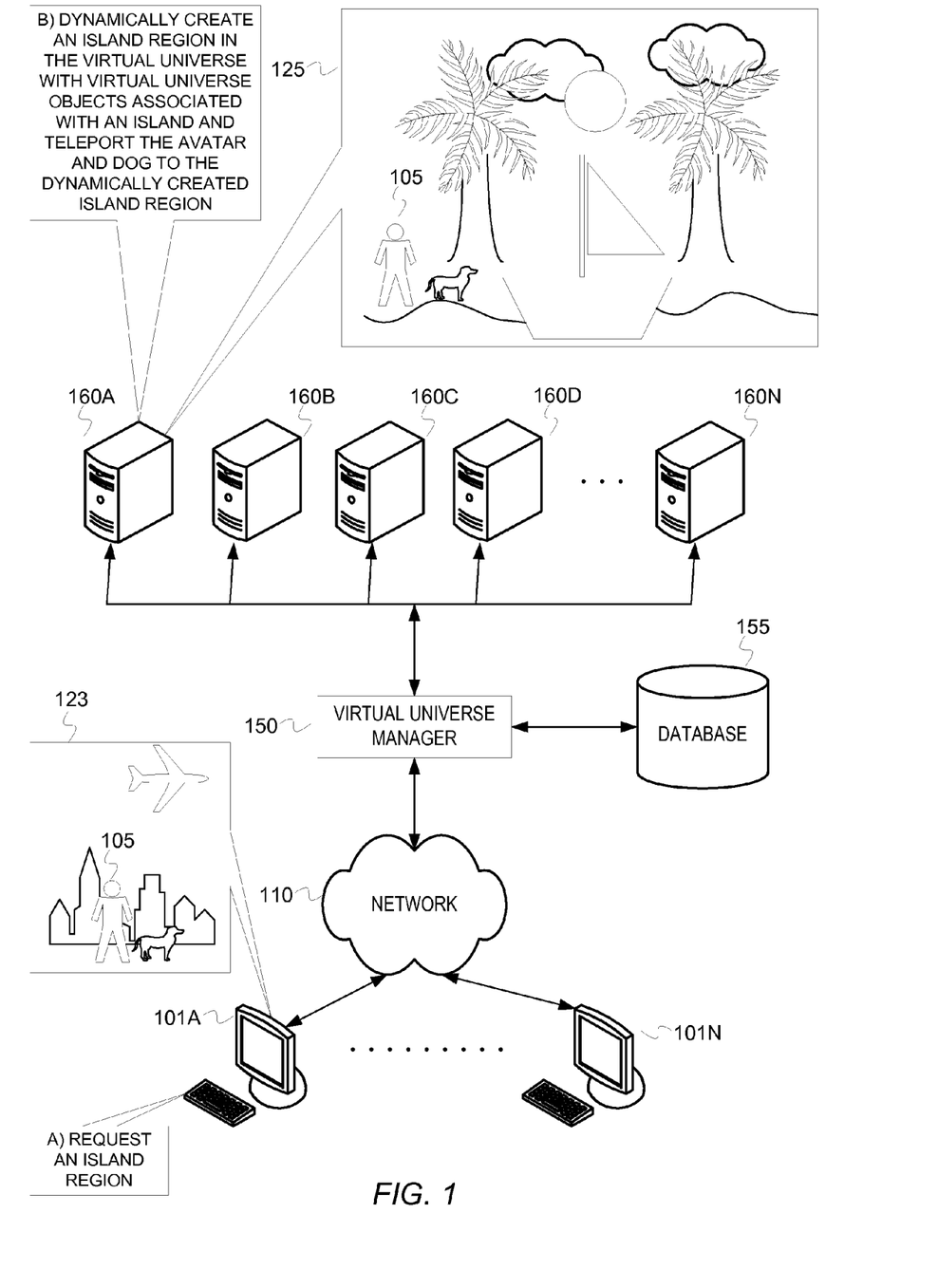
FIG. 1 conceptually depicts an example virtual universe system that dynamically creates a virtual universe region.

FIG. 1 conceptually depicts an example virtual universe system that dynamically creates a virtual universe region. The system includes a plurality of client computers 101A-N (hereinafter "client computers 101"), a network 110 (e.g. the Internet), a virtual universe manager 150, a virtual universe database 155, and a plurality of virtual universe host servers 160A-N (hereinafter "host servers 160"). A user of client computer 101A can access the virtual universe via the network 110 to perform activities in the virtual universe environment with an avatar 105. The user or "resident" of the virtual universe may be a person, group of people, or organization that controls at least one avatar and may own virtual land within the virtual universe. The user may use the avatar to traverse various regions within the virtual universe, inhabit a region, and interact with the environment and other avatars. A virtual universe region is defined as a virtual area (e.g., land, air, and/or water) within the virtual universe, typically supported by one or more servers. In the example illustrated with FIG. 1, each host server 160 may host one or more regions. Avatars can move within regions by walking, swimming, or flying, and across regions by teleporting from one region to another. It is noted, however, that avatars can move in many different ways (e.g., teleporting within regions, running, gliding, etc.).

Virtual universe manager 150 is the management and processing interface system between the client computers 101 and the host servers 160. Database 155 is the main storage system for the virtual universe environment. Similar to the host servers 160, virtual universe manager 150 and database 155 may be formed by a cluster of server systems. In some embodiments, client computers 101 interface with virtual universe manager 150 each time the client computers 101 communicate with the corresponding host servers 160. For example, virtual universe manager 150 may route information or commands to the corresponding host servers 160, process data, fetch information from database 155, etc. In other embodiments, client computers 101 may interface directly with the corresponding host servers 160 for some operations, and interface with virtual universe manager 150 for other operations. For instance, in various implementations, the user may communicate with virtual universe manager 150 to initiate operations for dynamically generating a region within the virtual universe, e.g., region perspective 125 illustrated on FIG. 1, which is shown being hosted by host server 160A. It is noted that host servers 160, virtual universe manager 150, and database 155 may be located in the same geographic location or distributed in various geographic locations. In another embodiment, one or more of the servers 160 embody all or a part of the functionality of the virtual universe manager. For instance, a first server may provide a list of different virtual universes to the client 101A. The client 101A then requests a connection with the server(s) that supports a particular virtual universe. After being connected, the supporting server can initiate operations to dynamically generate a region on the supporting server or a different server in a group of servers supporting the selected virtual universe. In another embodiment, a server for a different virtual universe performs the one or more operations to dynamically generate and instantiate the region.

A perspective 123 of the virtual universe rendered at the client 101A depicts the avatar 105 with a dog in a busy city. At a stage A, a user at the client 101A requests an island region, perhaps wanting to escape the hustle of the busy city. The client 101A transmits data indicating the request for an island region to the virtual universe manager 150. With the data, the server 160A dynamically creates an island region in the virtual universe. For example, the virtual universe manager 150 can collect the relevant virtual universe objects from the database 155 and pass them to the server 160A along with the request and/or a command to create a region. In another example, the virtual universe manager 150 forwards the request to the server 160A. The server 160A then creates the island region after identifying objects associated with an island. In FIG. 1, a perspective 125 of the dynamically created island region is depicted in association with the server 160A, although the perspective would be rendered at the client 101A.

Figure 2:
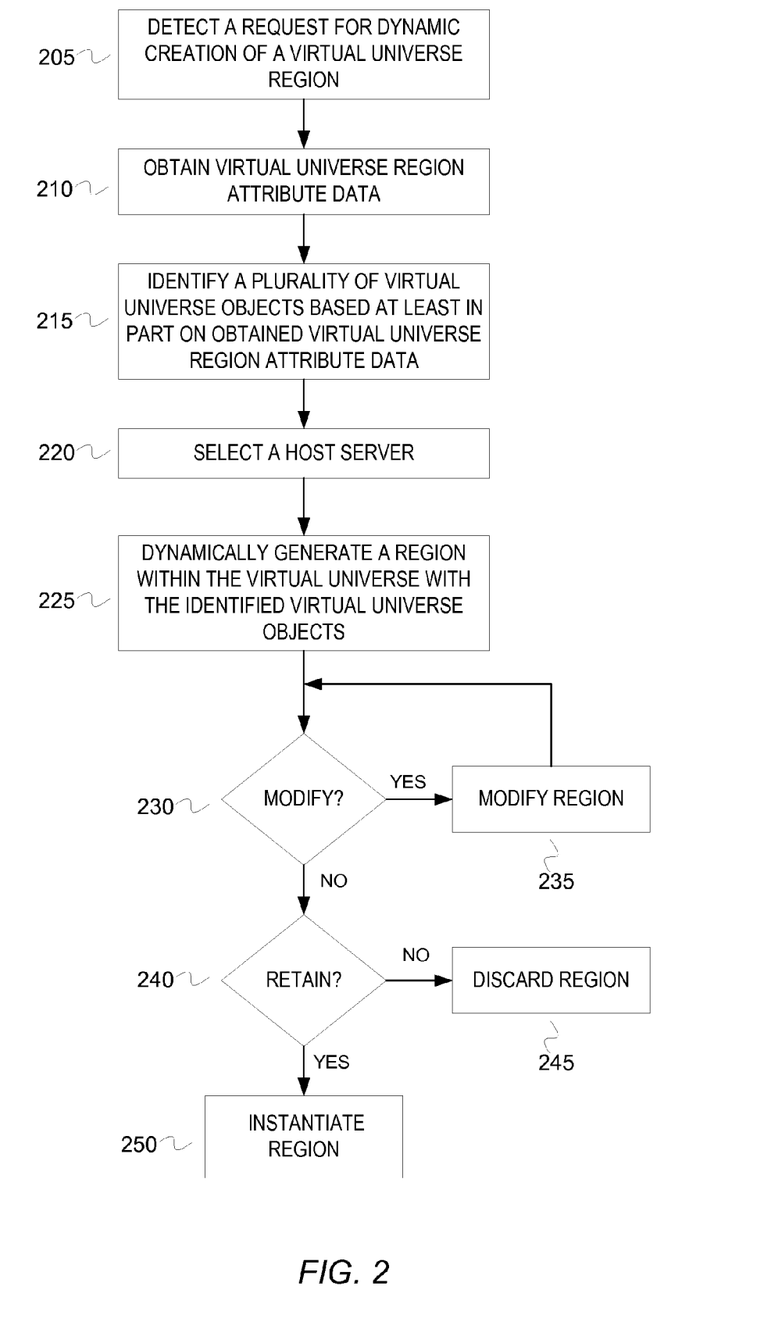
FIG. 2 is a flow diagram of example operations for dynamically generating a region within the virtual universe.

FIG. 2 is a flow diagram of example operations for dynamically generating a region within the virtual universe. At block 205, a request for dynamic generation of a virtual universe region is received. For instance, the dynamic generation request may be received by the virtual universe manager 150 and/or by at least one of the host servers 160 of the virtual universe system shown in FIG. 1. In one example, the dynamic generation request includes a user input indicating desired virtual universe attributes for the virtual universe region. The user input may be a natural language input or a keyword input. The user input may also be a table specifying the desired virtual universe region attributes.

It is noted, however, that the received request may include other types of user inputs such as predefined graphical user interface (GUI) inputs, symbol inputs, and/or coded inputs, among others. It is further noted that the user input may be a combination of user input types. In another example, the virtual universe system prompts the user for attribute information in response to receiving the dynamic generation request. In certain instances, a user input may not be received until the user is prompted for the attribute information.

At block 210, virtual universe region attribute data is obtained. For instance, virtual universe region attribute data may be obtained from one or more of the received user inputs and/or from information associated with a virtual universe account associated with the user-operated avatar. In various examples, the virtual universe region attribute data may be derived from user input received along with the dynamic generation request, or from user input received in response to the user being prompted for attribute information. Also, the virtual universe region attribute data can be derived from the virtual universe account associated with the user-operated avatar. Specifically, the virtual universe account may be accessed to obtain an indication of user-preferred virtual universe region attributes from the profile of the avatar (e.g., user-specified preferences regarding the virtual universe environment), historical information about the avatar (e.g., records of virtual locations visited by the avatar or purchases made by the avatar), and/or the demographics of the user controlling the avatar, among others.

In one example, natural language analysis algorithms are used to derive virtual universe region attribute data from natural language inputs and keyword analysis mechanisms are used to derive virtual universe region attribute data from keyword inputs. In some instances, feedback mechanisms may be used to narrow selection of virtual universe region attributes for ambiguous user specifications. In another example, in response to receiving the dynamic generation request, the virtual universe manager 150 may analyze and process information associated with the virtual universe account associated with the user-operated avatar to obtain an indication of virtual universe region attributes that the user may prefer for the generation of the region. For instance, if historical information about the avatar indicates that the avatar has been to various beaches and lakes, then the virtual universe manager 150 may determine based on this account information that the user controlling the avatar likely prefers a body of water within the virtual universe region that will be created. In some implementations, the user controlling the avatar may specify, e.g., via a GUI, whether or not to access the virtual universe account for deriving virtual universe region attributes, or may specify what specific account information to consider in determining the attribute data.

In a further example, after receiving the dynamic generation request, the user can be prompted to indicate the desired attributes for the virtual universe region, for instance, by providing the user with a GUI or a toolbar for an existing GUI. The user may generate a user input specifying the desired virtual universe region attributes via GUI components, such as check boxes, radio buttons, menus, lists, etc., that are associated with predefined virtual universe region attributes. The user may also be provided with mechanisms for submitting other types of user inputs, e.g., an area to type in desired virtual universe region attributes, such as natural language inputs or keyword inputs. Similarly, in some implementations, the user may be provided with a template having a selectable input mechanism for indicating the desired virtual universe region attributes. For example, a template for dynamic creation of a ski resort region may have selectable options for specifying the number of mountains, the number and difficulty of the trails, the number and location of restaurants, etc. It is noted, however, that in some implementations multiple templates may be presented to the user to obtain user input for dynamically generating a virtual universe region, for example, ski mountain templates, restaurant templates, hotel templates, etc.

In some cases, a user input, e.g., a natural language and/or keyword input, may only indicate basic virtual universe region attributes. In these cases, additional virtual universe region attribute data can be derived based on information associated with the virtual universe account associated with the user-operated avatar, as described above. Also, in various implementations, additional virtual universe attributes that are related to the basic virtual universe region attributes indicated by the user may be derived based on predefined relationships. In other words, predefined relationships, e.g., stored in the virtual universe manager 150 or database 155, may link certain virtual universe region attributes to other virtual universe region attributes. For instance, virtual universe region attributes that indicate specific details of a virtual universe region may be linked to virtual universe region attributes that indicate basic or generic features of the virtual universe region. For example, if a user input indicates that the user desires a basic tropical beach area within the region, the system may also select virtual universe region attributes related to specific characteristics of typical beach areas, such as sand and palm trees, even though the user did not specify these details. Based on the user specifications and/or user account observations, the system may automatically select additional virtual universe region attributes that will add details related to the type of region selected by the user. It is noted, however, that in some embodiments the received user input may indicate both generic virtual universe region attributes and at least some specific virtual universe region attributes.

At block 215, a plurality of virtual universe objects are identified based, at least in part, on the obtained virtual universe region attribute data that indicates one or more region attributes in a virtual universe. The virtual universe objects may be virtual landscape objects, virtual background objects, virtual animal objects, automated avatars, and virtual cityscape objects, among others. In one specific implementation, virtual universe manager 150 and/or database 155 stores relationships between virtual universe region attributes and virtual universe objects. In response to deriving the virtual universe region attribute data from user inputs and/or user account observations, virtual universe manager 150 identifies the virtual universe objects that are related to the derived virtual universe region attribute data. For example, for automated avatars, which are software-controlled avatars with predefined looks, gestures, capabilities, and movements, virtual universe manager 150 may identify automated avatars within database 155 having characteristics that are related to the derived attribute information. It is noted, however, that in some implementations, if virtual universe manager 150 does not identify related virtual universe objects within database 155 (or other storage areas), virtual universe manager 150 may dynamically create virtual universe objects having characteristics that are related to the derived attribute information.

At block 220, before the dynamic generation process initiates (or shortly thereafter), a host server 160 is selected to host the dynamically generated virtual universe region. In various implementations, virtual universe manager 150 may implement a load-based selection scheme to select the host server 160. In other words, the system may select a host server 160 with the least number of active virtual universe regions or the least number of consumed computational resources. In some implementations, the host server 160 may be selected from a plurality of servers that are specifically designed to host dynamically generated regions. If a dynamic generation request exceeds the designated server capacity to host dynamically generated regions, the request may be denied, the request may be queued until resources are available, the oldest generated region may be removed to free resources, etc. Furthermore, in other implementations, if a user specifies dynamic creation of a region on a specific island or other existing virtual universe area, the server hosting the island may be selected to host the dynamically generated region. It is noted, however, that the host server may be selected by various other methods, e.g., based on geographic location of the server for distributed virtual universe host systems.

At block 225, a region within the virtual universe is dynamically generated with the plurality of identified virtual universe objects. Specifically, the virtual universe region is dynamically generated by selecting a base region and adding the plurality of identified virtual universe objects to the base region. For example, virtual universe region perspective 125 shown in FIG. 1 may be created by selecting an island base region and adding in palm tree objects, a boat object, and a dog object.

In various implementations, the automatic layout of the virtual universe objects within the base region may be guided by a variety of creation rules, e.g., no two virtual universe objects should overlap, items of furniture should be grouped close together, electrical devices should be placed a certain distance away from water sources, etc. Virtual universe manager 150 and/or database 155 may host the creation rules for implementation during dynamic generation of the virtual universe region. In some cases, at least a subset of the virtual universe rules for object placement may be determined by analyzing the existing virtual universe and determining the most common relationships between objects. For instance, the system may detect that 87% of all ottoman objects are placed one foot in front of the corresponding chair objects. In some implementations, virtual universe objects may include metadata indicating predefined relationships between objects. For example, a toaster object may include metadata indicating the virtual toaster should be placed at least five feet away from the kitchen sink.

At any point in time before, during, or after creation, virtual universe manager 150 may receive user instructions requesting user-operated avatars having certain characteristics for the dynamically generated virtual universe region. In one implementation, in response to receiving such requests, virtual universe manager 150 may search the virtual universe to find user-operated avatars having the specified characteristics. Then, virtual universe manager 150 may transmit automated teleport invitations to the user-operated avatars having the specified characteristics inviting the avatars to teleport to the dynamically generated virtual universe region.

After creation, the dynamically generated region is presented for evaluation. For instance, the dynamically generated region is presented to the user for evaluation via the client 101A shown in FIG. 1. It is noted, however, that in some example, virtual universe manager 150 may receive a request, e.g., from the region creator, to present the dynamically generated region to another virtual universe user, or to a group of virtual universe users.

At block 230, it is determined whether a modification request is received from the user. For instance, the user may evaluate the dynamically generated region by entering the region using the avatar. Based on the evaluation, the user can determine whether or not to modify the region. For example, the user may have originally requested five trees to be placed within the region; however, upon evaluating the region, the user may decide that fifty trees would be preferred. Virtual universe manager 150 may receive a modification request including user input specifying the desired modifications. The user may provide user input by various methods, as previously described above. It is noted, however, that in some implementations, virtual universe manager 150 may receive multiple modification requests, e.g., from the same user or from multiple users evaluating the region.

At block 235, after receiving a modification request, virtual universe manager dynamically modifies the virtual universe region. In some implementations, virtual universe manager 150 may dynamically modify the virtual universe region without having to reconstruct the entire region. It is noted, however, that in some cases, depending on the degree of modification, the virtual universe region may be reconstructed.

At block 240, it is determined whether or not to retain the dynamically generated virtual universe region. For instance, upon exiting the virtual universe region (e.g., after evaluation), the user controlling the avatar may be prompted to determine whether to retain the region within the virtual universe. For example, the user may be presented a dialog box for selection of whether to retain or discard the virtual universe region. It is noted, however, that the user may have the option to select whether to retain or discard the virtual universe region at any point in time after creation.

At block 245, if user instructions are received to discard the virtual universe region, the region is deleted from the virtual universe. For example, virtual universe manager 150 may discard the virtual universe region as the user exits the region after evaluation. At block 250, if user instructions are received to retain the virtual universe region, the region is instantiated within the virtual universe. After instantiation, the dynamically generated virtual universe region may be visible to other users of the virtual universe. In various implementations, a fee may be required in order to retain and instantiate the region. For example, virtual universe manager 150 may prompt the user for payment information after the user selects the option to retain the region. It is noted, however, that in some implementations, the dynamically generated region may be temporarily instantiated within the virtual universe, or in a separate virtual universe, after dynamic creation, and the virtual universe manager 150 can determine whether to retain or discard the dynamically generated region based on user instructions.

Figure 3:
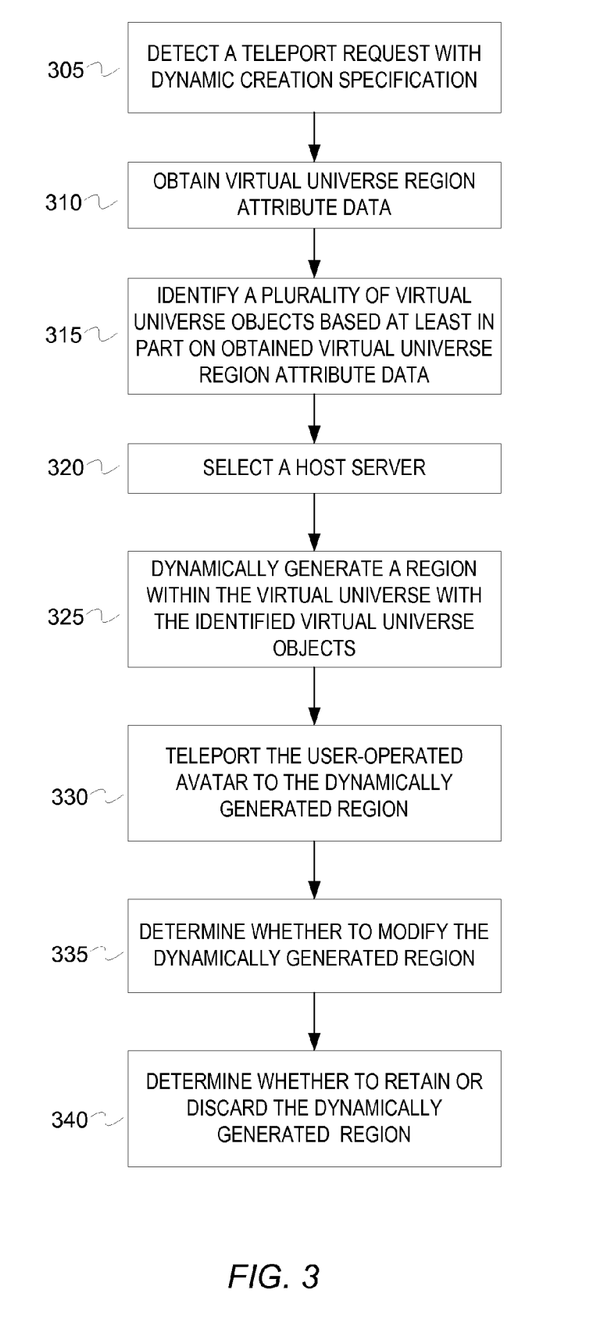
FIG. 3 is a flow diagram of example operations for dynamically generating a region within the virtual universe based on a teleportation request.

FIG. 3 is a flow diagram of example operations for dynamically generating a region within the virtual universe based on a teleportation request. At block 305, a teleport request is received, e.g., from the user controlling the avatar, to dynamically generate a virtual universe region and, after generation, to teleport the avatar to the dynamically generated virtual universe region. In various examples, virtual universe manager 150 may receive user input indicating the desired virtual universe attributes for the virtual universe region along with the teleport request, or may prompt the user for input in response to receiving the teleport request. At block 310, virtual universe region attribute data is obtained, e.g., from one or more of the received user inputs and/or from information associated with a virtual universe account associated with the user-operated avatar.

At block 315, a plurality of virtual universe objects are identified based, at least in part, on the obtained virtual universe region attribute data that indicates one or more region attributes in a virtual universe. At block 320, before the dynamic generation process initiates (or shortly thereafter), a host server is selected to host the dynamically generated virtual universe region. At block 325, a region within the virtual universe is dynamically generated with the plurality of identified virtual universe objects.

At block 330, the user-operated avatar is teleported to the dynamically generated virtual universe region. For example, the avatar may be teleported immediately after dynamic generation to the newly created region, perhaps to evaluate the region. At block 335, it is determined whether to modify the dynamically generated virtual universe region based on whether a modification request is received. At block 340, it is determined whether to retain or discard the dynamically generated virtual universe region. For example, a user responds to a prompt to indicate if the virtual region is to be retained or discarded. In another example, if user input or configurations indicate that the virtual universe region should be retained, the region is instantiated within the virtual universe.

It should be understood that the depicted flow diagrams are examples meant to aid in understanding embodiments and should not be used to limit embodiments or limit scope of the claims. Embodiments may perform additional operations, fewer operations, operations in a different order, operations in parallel, and some operations differently. For instance, referring to FIGS. 2 and 3, the user may provide requests to modify the dynamically generated virtual universe region at any point in time after creation. Also, the user may be provided with the option to discard or retain the dynamically generated virtual universe region any time after creation. Furthermore, it some implementations, the user controlling the avatar may have the option of dynamically generating part of a region, a complete region, or multiple regions.

Dynamic generation of regions allows virtual universe users to create regions that are tailored to their desired specifications. At the same time, users have the option to instantly discard the created region after evaluation if the region does not meet the user's expectations. Dynamic generation of regions may increase overall satisfaction of virtual universe users, which may help improve user retention, increase rate of active users, and increase returning user visits. Furthermore, dynamic generation and instantiation of regions introduces a new potential revenue generation source for the virtual universe administrator, and provides users additional options for business ventures within the virtual universe.

In one specific example, the dynamic region creator may request user-operated avatars for a newly created region for marketing or other business related purposes. The dynamic region creator may specify desired, requirements, and characteristics of the invited avatars, e.g., using a GUI. A service provider, such as virtual universe manager 150, may obtain the user-operated avatars by transmitting automated teleport requests to avatars having matching profiles or inventory items indicating a likelihood of a match. Virtual universe manager 150 may be remunerated for locating the avatars and those remunerations may be dispersed to the avatars that accept the teleportation requests. Remuneration may depend on such factors as the duration of time the avatar spent in the new region, the level of interaction between the region creator and the avatar, a rating of avatar helpfulness by the region creator, the speed with which the avatar accepted the teleport invitation, and other factors.

Dynamic generation of virtual universe regions may be utilized to conduct various other types of business in the virtual universe environment. For example, corporations may showcase a prototype of a product within the dynamically generated region, and presentations may be conducted to a large audience of potential investors. After a specific event, the region can be dynamically modified to serve other purposes.

Embodiments may take the form of an entirely hardware embodiment, a software embodiment (including firmware, resident software, micro-code, etc.), or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code stored in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine readable medium includes any mechanism for storing ("machine-readable storage medium") information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 4:
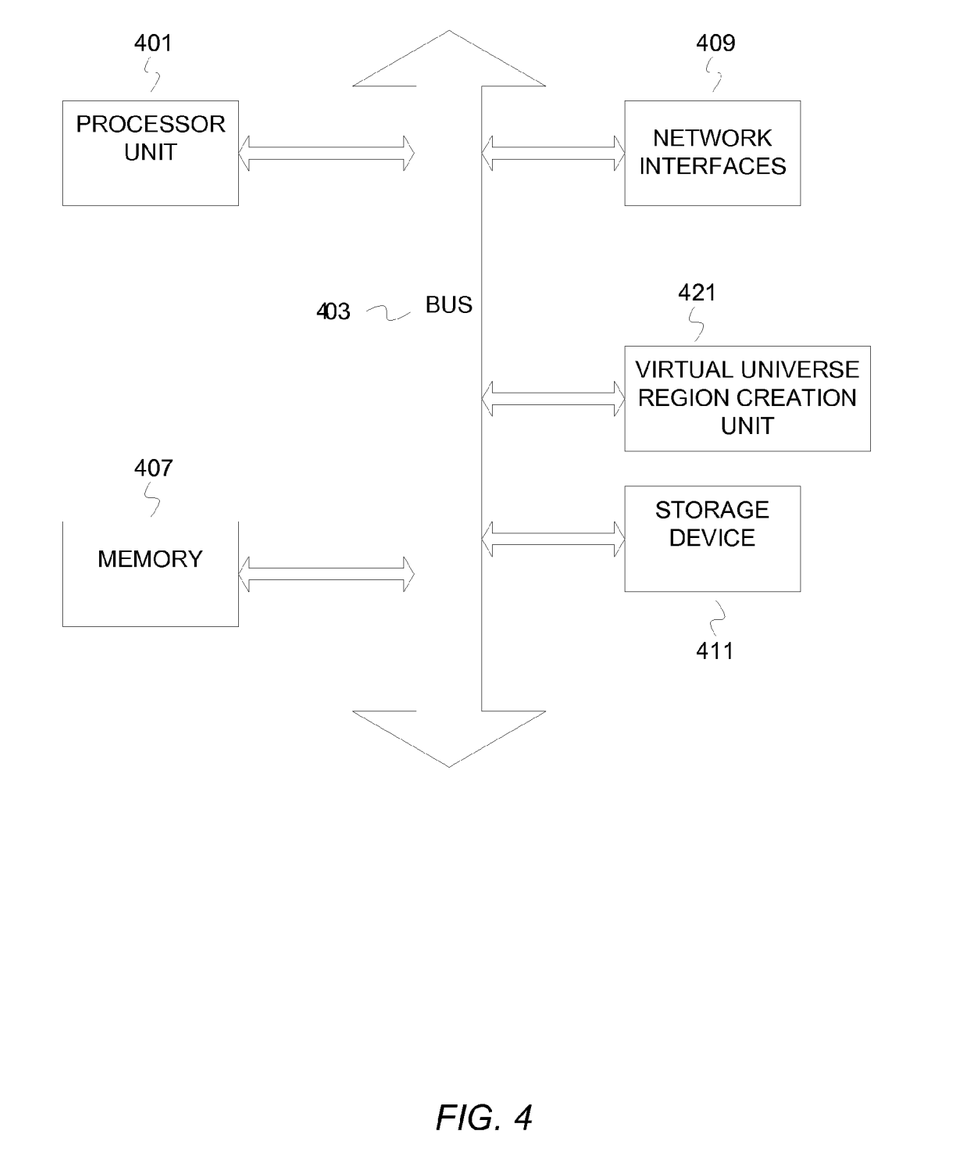
FIG. 4 depicts an example computer system.

FIG. 4 depicts an example computer system. A computer system includes a processor unit 401 (possibly including multiple processors, multiple cores, multiple nodes, and/or implementing multi-threading, etc.). The computer system includes memory 407. The memory 407 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 403 (e.g., PCI, ISA, PCI-Express, HyperTransport®, InfiniBand®, NuBus, etc.), a network interface 405 (e.g., an ATM interface, an Ethernet interface, a Frame Relay interface, SONET interface, wireless interface, etc.), and a storage device(s) 409 (e.g., optical storage, magnetic storage, etc.). The computer system also includes a virtual universe region creation unit 421 to implement embodiments described above. The virtual universe region creation unit 421 includes one or more functionalities that facilitate dynamic generation of a virtual universe region within the virtual universe. Any one of these functionalities may be partially (or entirely) implemented in hardware and/ or on the processing unit 401. For example, the functionality may be implemented with an application specific integrated circuit, in logic implemented in the processing unit 401, in a co-processor on a peripheral device or card, etc. Further, realizations may include fewer or additional components not illustrated in FIG. 4 (e.g., video cards, audio cards, additional network interfaces, peripheral devices, etc.). The processor unit 401, the storage device(s) 409, and the network interface 405 are coupled to the bus 403. Although illustrated as being coupled to the bus 403, the memory 407 may be coupled to the processor unit 401.

While the embodiments are described with reference to various implementations and exploitations, it will be understood that these embodiments are illustrative and that the scope of the inventive subject matter is not limited to them. In general, techniques for dynamic generation of a virtual universe region within the virtual universe environment as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   a computer receiving a teleport request from a user controlling an avatar in a first virtual region of a virtual universe to teleport the avatar from the first virtual region to a second virtual region; and
   in response to the teleport request, the computer creating the second virtual region, wherein creating the second virtual region includes:
      the computer determining virtual universe region attribute data that indicates one or more region attributes in the virtual universe, wherein the virtual universe region attribute data is associated with the avatar;
      the computer identifying a plurality of virtual universe objects based, at least in part, on the virtual universe region attribute data; and
      the computer dynamically generating the second virtual region within the virtual universe with the plurality of virtual universe objects associated with the virtual universe region attribute data, the second virtual region comprising an area within the virtual universe that can be inhabited and traversed by avatars of the virtual universe.

2. The method of claim 1, wherein the plurality of virtual universe objects comprises at least one of virtual landscape objects, virtual background objects, virtual animal objects, automated avatars, and virtual cityscape objects.

3. The method of claim 1, wherein the computer dynamically generating the second virtual region within the virtual universe comprises:
   the computer selecting a base region;
   the computer adding the plurality of virtual universe objects to the base region; and
   the computer generating the area within the virtual universe that can be inhabited and traversed by avatars of the virtual universe based on the base region and the plurality of virtual universe objects.

4. The method of claim 1, wherein the computer determining the virtual universe region attribute data comprises at least one of reading a profile of the avatar, evaluating historical information about the avatar, accessing a region template associated with the avatar, and receiving input from a user controlling the avatar.

5. The method of claim 1, wherein the computer determining the virtual universe region attribute data comprises the computer deriving the virtual universe region attribute data from a natural language input or a keyword input provided by the user.

6. The method of claim 1, wherein the computer dynamically generating the second virtual region within the virtual universe is performed in response to the computer receiving a dynamic generation request from the user controlling the avatar.

7. The method of claim 1, further comprising the computer retaining or discarding the dynamically generated second virtual region based on user instructions.

8. The method of claim 1, further comprising, after said dynamically generating the second virtual region within the virtual universe, the computer adding objects to or removing objects from the dynamically generated region based on one or more inputs provided by the user controlling the avatar and/or information associated with a virtual universe account associated with the avatar.

9. The method of claim 1, further comprising, in response to receiving a request for user-operated avatars having specified attributes, the computer transmitting automated teleport invitations to certain user-operated avatars having the specified attributes, the invitations inviting the certain user-operated avatars to teleport to the dynamically generated second virtual region.

10. The method of claim 1, further comprising the computer selecting a server to host the dynamically generated second virtual region according to one or more characteristics of the second virtual region.

11. The method of claim 1, further comprising the computer selecting a server to host the dynamically generated second virtual region, the selecting comprising at least one of selecting the server from a plurality of servers designated to host dynamically generated virtual universe regions and selecting the server according to a load balancing scheme.

12. The method of claim 1, wherein the computer dynamically generating the second virtual region comprises the computer dynamically generating the second virtual region according to a rule-based generation scheme specifying relationships between the selected virtual universe objects.

13. A method comprising:
    a computer receiving a teleport request from a user controlling an avatar in a first virtual region of a virtual universe to teleport the avatar from the first virtual region to a second virtual region;
    in response to the teleport request, the computer creating the second virtual region, wherein creating the second virtual region includes:
        the computer identifying a plurality of virtual universe objects based, at least in part, on virtual universe region attribute data that indicates one or more region attributes for dynamically generating the second virtual region within the virtual universe, wherein the virtual universe region attribute data is associated with the avatar; and
        the computer dynamically generating the second virtual region within the virtual universe with the plurality of virtual universe objects associated with the virtual universe region attribute data, the second virtual region comprising an area within the virtual universe that can be inhabited and traversed by avatars of the virtual universe; and
    the computer teleporting the avatar to the second virtual region within the virtual universe in response to the computer dynamically generating the second virtual region.

14. The method of claim 13, further comprising the computer determining the virtual universe region attribute data from information associated with a virtual universe account associated with the avatar.

15. The method of claim 13, further comprising, in response to the computer receiving the teleport request from the user controlling the avatar, the computer providing the user a graphical user interface (GUI) comprising one or more mechanisms for inputting and selecting virtual universe region attributes for dynamically generating the second virtual region within the virtual universe.

16. The method of claim 13, further comprising the computer permanently instantiating or discarding the dynamically generated second virtual region based on user instructions.

17. A computer program product for implementing dynamic generation of virtual universe regions, the computer program product comprising:
    one or more computer-readable tangible storage devices;
    program instructions, stored on at least one of the one or more storage devices, to receive a teleport request from a user controlling an avatar in a first virtual region of a virtual universe to teleport the avatar from the first virtual region to a second virtual region different from the first virtual region; and
    program instructions, stored on at least one of the one or more storage devices, to, in response to the teleport request, create the second virtual region, wherein the program instructions to create the second virtual region include:
        program instructions to determine virtual universe region attribute data that indicates one or more region attributes in the virtual universe, wherein the virtual universe region attribute data is associated with the avatar;
        program instructions to identify a plurality of virtual universe objects based, at least in part, on the virtual universe region attribute data; and
        program instructions to dynamically generate the second virtual region within the virtual universe with the plurality of virtual universe objects associated with the virtual universe region attribute data, the second virtual region comprising an area within the virtual universe that can be inhabited and traversed by avatars of the virtual universe.

18. The computer program product of claim 17, further comprising program instructions, stored on at least one of the one or more storage devices, to obtain the virtual universe region attribute data, wherein said program instructions to obtain the virtual universe region attribute data comprise program instructions to at least one of read a profile of the avatar, evaluate historical information about the avatar, access a region template associated with the avatar, and receive input from the user controlling the avatar.

19. A computer system for implementing dynamic generation of virtual universe regions, the computer system comprising:
    one or more processors, one or more computer-readable memories and one or more computer-readable tangible storage devices;
    program instructions, stored on at least one of the one or more storage devices for execution by at least one of the one or more processors via at least one of the one or more memories, to receive a teleport request from a user controlling an avatar in a first virtual region of a virtual universe to teleport the avatar from the first virtual region to a second virtual region different from the first virtual universe; and
    program instructions, stored on at least one of the one or more storage devices for execution by at least one of the one or more processors via at least one of the one or more memories, to, in response to the request, create the second virtual region, wherein the program instructions to create the second virtual region include:
        program instructions to determine virtual universe region attribute data that indicates one or more region attributes in the virtual universe, wherein the virtual universe region attribute data is associated with the avatar;
        program instructions to identify a plurality of virtual universe objects based, at least in part, on virtual universe region attribute data; and
        program instructions to dynamically generate the second virtual region within the virtual universe with the plurality of virtual universe objects associated with the virtual universe region attribute data, the second virtual region comprising an area within the virtual universe that can be inhabited and traversed by avatars of the virtual universe.

20. The computer system of claim 19, further comprising:
    program instructions, stored on at least one of the one or more storage devices for execution by at least one of the one or more processors via at least one of the one or more memories, to obtain the virtual universe region attribute data, wherein said program instructions to obtain the virtual universe region attribute data comprise program instructions to at least one of read a profile of the avatar, evaluate historical information about the avatar, access a region template associated with the avatar, and receive input from the user controlling the avatar.

* * * * *